US009612852B1

(12) United States Patent
Benameur et al.

(10) Patent No.: US 9,612,852 B1
(45) Date of Patent: Apr. 4, 2017

(54) TECHNIQUES FOR REDIRECTING INPUT/OUTPUT

(71) Applicant: Veritas Technologies LLC, Mountain View, CA (US)

(72) Inventors: Azzedine Benameur, Fairfax Station, VA (US); Nathan S. Evans, Sterling, VA (US)

(73) Assignee: Veritas Technologies LLC, Mountain View, CA (US)

( * ) Notice: Subject to any disclaimer, the term of this patent is extended or adjusted under 35 U.S.C. 154(b) by 486 days.

(21) Appl. No.: 13/718,805

(22) Filed: Dec. 18, 2012

(51) Int. Cl.
*G06F 9/455* (2006.01)

(52) U.S. Cl.
CPC .................................... *G06F 9/455* (2013.01)

(58) Field of Classification Search
None
See application file for complete search history.

(56) References Cited

U.S. PATENT DOCUMENTS

| | | | | |
|---|---|---|---|---|
| 6,832,367 | B1* | 12/2004 | Choi et al. | 717/130 |
| 8,666,938 | B1* | 3/2014 | Pancholy | 707/610 |
| 2009/0249357 | A1* | 10/2009 | Chanda et al. | 719/314 |
| 2010/0094861 | A1* | 4/2010 | Andrade et al. | 707/713 |
| 2011/0060722 | A1* | 3/2011 | Li et al. | 707/649 |
| 2013/0007407 | A1* | 1/2013 | Gupta | G06F 12/1036 711/207 |

OTHER PUBLICATIONS

Yasushi Saito, "Jockey: A User-Space Library for Record-Replay Debugging," Hewlett Packard Pub. HPL-2005-46 (Mar. 7, 2005), available at <http://www.hpl.hp.com/techreports/2005/HPL-2005-46.pdf>. 12 pages.
"Ioreplay," IOapps (last updated Nov. 3, 2010), 4 pages. Available at <http://code.google.com/p/ioapps/wiki/ioreplay>, accessed May 17, 2013.
"Ioprofiler," IOapps (last updated Apr. 10, 2011), 3 pages. Available at http://code.google.com/p/ioapps/wiki/ioprofiler, accessed May 17, 2013.
Zhenyu Guo et al., "R2: An Application-Level Kernel for Record and Replay," Proc. of the 8th USENIX Conf. on Operating Systems Design and Implementation (OSDI'08), 2008, pp. 193-208, available at <http://dl.acm.org/citation.cfm?id=1855741.1855755>. accessed May 17, 2013—Abstract Only, 1 page.

* cited by examiner

*Primary Examiner* — Umut Onat
(74) *Attorney, Agent, or Firm* — Wilmer Cutler Pickering Hale and Dorr LLP (57) ABSTRACT

Techniques for redirecting input/output are disclosed. In one particular embodiment, the techniques may be realized as a method for redirecting input/output comprising the steps of method for redirecting input/output comprising configuring a first virtual machine with a recorder for library interposition, configuring a replica virtual machine with a player for library interposition, receiving a first recorded event from the first virtual machine, and transferring the first recorded event to the replica virtual machine for replay.

20 Claims, 7 Drawing Sheets

TECHNIQUES FOR REDIRECTING INPUT/OUTPUT

STATEMENT REGARDING FEDERALLY SPONSORED RESEARCH OR DEVELOPMENT

The present disclosure relates generally to research funded by the United States Department of the Air Force Research Laboratory under Contract No. FA8650-10-C-7024, titled "IARPA StoneSoup—Minestrone."

FIELD OF THE DISCLOSURE

The present disclosure relates generally to virtual machines and, more particularly, to techniques for redirecting input/output.

BACKGROUND OF THE DISCLOSURE

Computer programs behave differently depending on the input they receive. Sometimes it is necessary for a computer program to receive identical input each time it is run. For example, a customer may receive an error message while using the computer program. A support technician needs to be able to reproduce the error to debug the computer program. The support technician may ask the customer to provide step-by-step instructions that lead to the error message. For example, the customer may tell the technician that clicking the Save button when Caps Lock is enabled causes the computer program to crash. The technician will then note that the steps to reproduce the error are: 1) enable Caps Lock; then 2) click the Save button. The input to the program—enabling Caps Lock and then clicking Save— may consistently crash the program every time the program runs.

In some situations, a computer program may receive non-deterministic input that causes the program to behave differently each time the program runs. Network input is a common source of non-deterministic input. The program may be susceptible to crashing given a specific sequence of input events that must be reproduced exactly to trigger the crash while debugging or performing other testing.

Non-deterministic input also hinders attack mitigation analysis. For example, certain network traffic received by a program may be known to cause buffer overflow on a particular operating system on a particular computer architecture. A buffer overflow is an example of a severe program bug because malicious programs can exploit them over a network to infect or damage the computer running the program that is susceptible to the buffer overflow. To evaluate whether this network traffic can cause the same buffer overflow on other operating systems or computer architectures, the program on each configuration must receive the same network input to test it.

Conventional techniques for reproducing input to a computer program have significant shortcomings. For example, IOapps tools use library interposition to record and playback system events. IOapps interposes a recorder program between a computer program executable and an operating system's library (e.g., "libc") to trace or intercept system calls. However, like most record-and-replay implementations, IOapps records some libc function calls (currently 20) and attempts to re-execute (replay) them exactly as recorded. IOapps is heavyweight, interposing only on a subset of low-level input/output ("I/O"), and inflexible, not providing any options for allowing network input playback.

Jockey is another conventional record-and-replay implementation. Jockey operates at an even lower level than IOapps, instrumenting operating system level system calls. Jockey does not provide high-level library interposition.

Another record-and-replay implementation, R2, requires that the computer program be developed for the system. Software developers must instrument their computer code with R2' s record-and-replay system in mind. R2 cannot support computer programs that have not been instrumented for R2.

In view of the foregoing, it may be understood that there may be significant problems and shortcomings associated with conventional technologies for redirecting I/O.

SUMMARY OF THE DISCLOSURE

Techniques for redirecting input/output are disclosed. In one particular embodiment, the techniques may be realized as a method for redirecting input/output comprising configuring a first virtual machine with a recorder for library interposition, configuring a replica virtual machine with a player for library interposition, receiving a first recorded event from the first virtual machine, and transferring the first recorded event to the replica virtual machine for replay.

In accordance with further aspects of this particular embodiment, further comprising receiving a subsequent recorded event from the first virtual machine after the first recorded event was transferred for replay.

In accordance with further aspects of this particular embodiment, further comprising configuring a plurality of replica virtual machines, wherein each replica virtual machine of the plurality of replica virtual machines may be configured with a player of a plurality of players for library interposition, and transferring the first recorded event to at least two replica virtual machines of the plurality of replica virtual machines for replay, wherein the first recorded event may be transferred to the at least two replica virtual machines of the plurality of replica virtual machines concurrently for replay.

In accordance with further aspects of this particular embodiment, wherein the first virtual machine may comprise a first architecture, and wherein the replica virtual machine may comprise a second architecture different from the first architecture.

In accordance with further aspects of this particular embodiment, wherein the first recorded event may be a network-based input/output event.

In accordance with further aspects of this particular embodiment, wherein the first recorded event may be transferred through a local pipe.

In accordance with further aspects of this particular embodiment, wherein the first recorded event may be transferred through a network pipe.

In accordance with further aspects of this particular embodiment, wherein the first recorded event may comprise a data transmission associated with the event.

In another particular exemplary embodiment, the techniques may be realized as a system for redirecting input/output comprising one or more processors communicatively coupled to a network, wherein the one or more processors are configured to configure a first virtual machine with a recorder for library interposition, configure a replica virtual machine with a player for library interposition, receive a first recorded event from the first virtual machine, and transfer the first recorded event to the replica virtual machine for replay.

In accordance with additional aspects of this particular embodiment, wherein the one or more processors are further configured to receive a subsequent recorded event from the first virtual machine after the first recorded event was transferred for replay.

In accordance with additional aspects of this particular embodiment, wherein the one or more processors are further configured to configure a plurality of replica virtual machines, wherein each replica virtual machine of the plurality of replica virtual machines may be configured with a player of a plurality of players for library interposition, and transfer the first recorded event to at least two replica virtual machines of the plurality of replica virtual machines for replay, wherein the first recorded event may be transferred to the at least two replica virtual machines of the plurality of replica virtual machines concurrently for replay.

In accordance with additional aspects of this particular embodiment, wherein the first recorded event may be a network-based input/output event.

In accordance with additional aspects of this particular embodiment, wherein the first recorded event may be transferred through a network pipe.

In accordance with additional aspects of this particular embodiment, wherein the first recorded event may comprise a data transmission associated with the event.

In yet another particular exemplary embodiment, the techniques may be realized as an article of manufacture for redirecting input/output, the article of manufacture comprising at least one non-transitory processor readable storage medium, and instructions stored on the at least one medium, wherein the instructions are configured to be readable from the at least one medium by at least one processor and thereby cause the at least one processor to operate so as to configure a first virtual machine with a recorder for library interposition, configure a replica virtual machine with a player for library interposition, receive a first recorded event from the first virtual machine, and transfer the first recorded event to the replica virtual machine for replay.

In accordance with additional aspects of this particular embodiment, the instructions may cause the at least one processor to operate further so as to receive a subsequent recorded event from the first virtual machine after the first recorded event was transferred for replay.

In accordance with additional aspects of this particular embodiment, the instructions may cause the at least one processor to operate further so as to configure a plurality of replica virtual machines, wherein each replica virtual machine of the plurality of replica virtual machines may be configured with a player of a plurality of players for library interposition, and transfer the first recorded event to at least two replica virtual machines of the plurality of replica virtual machines for replay, wherein the first recorded event may be transferred to the at least two replica virtual machines of the plurality of replica virtual machines concurrently for replay.

In accordance with additional aspects of this particular embodiment, wherein the first recorded event may be a network-based input/output event.

In accordance with additional aspects of this particular embodiment, wherein the first recorded event may be transferred through a network pipe.

In accordance with additional aspects of this particular embodiment, wherein the first recorded event may comprise a data transmission associated with the event.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
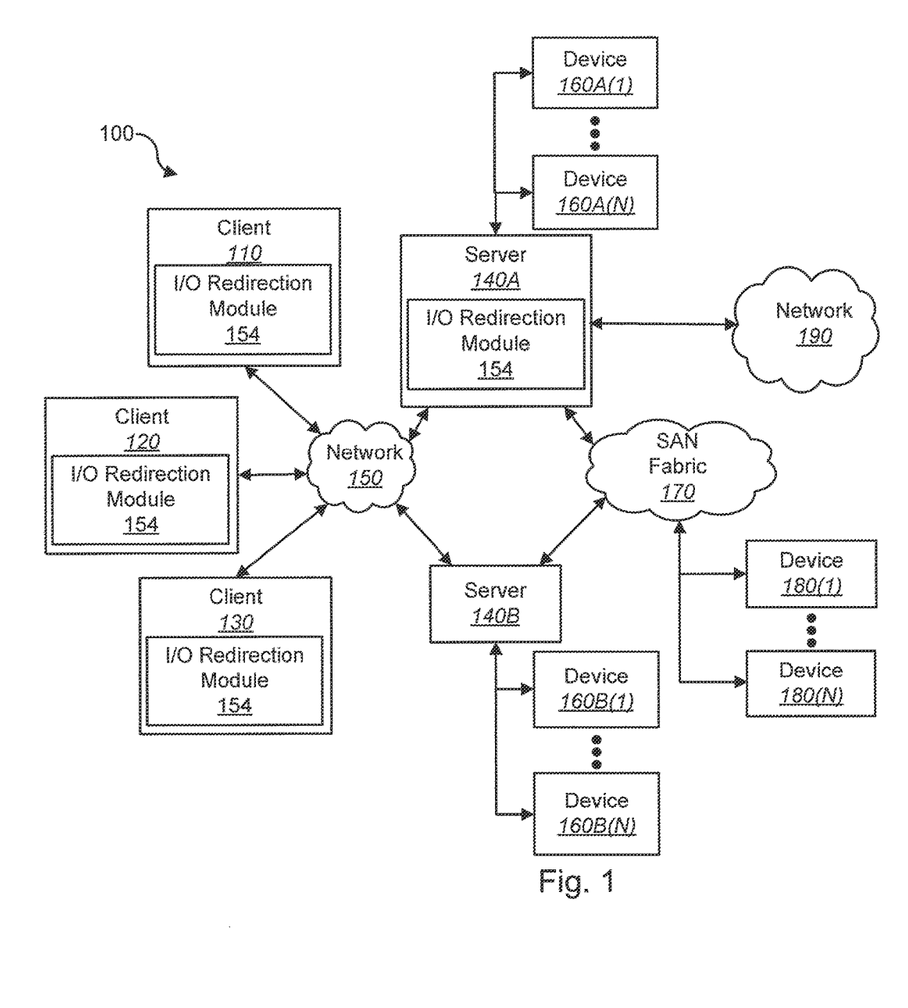
FIG. 1 shows a block diagram depicting a network architecture for I/O redirection in accordance with an embodiment of the present disclosure.

FIG. 1 shows a block diagram depicting a network architecture 100 for I/O redirection in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., I/O redirection module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
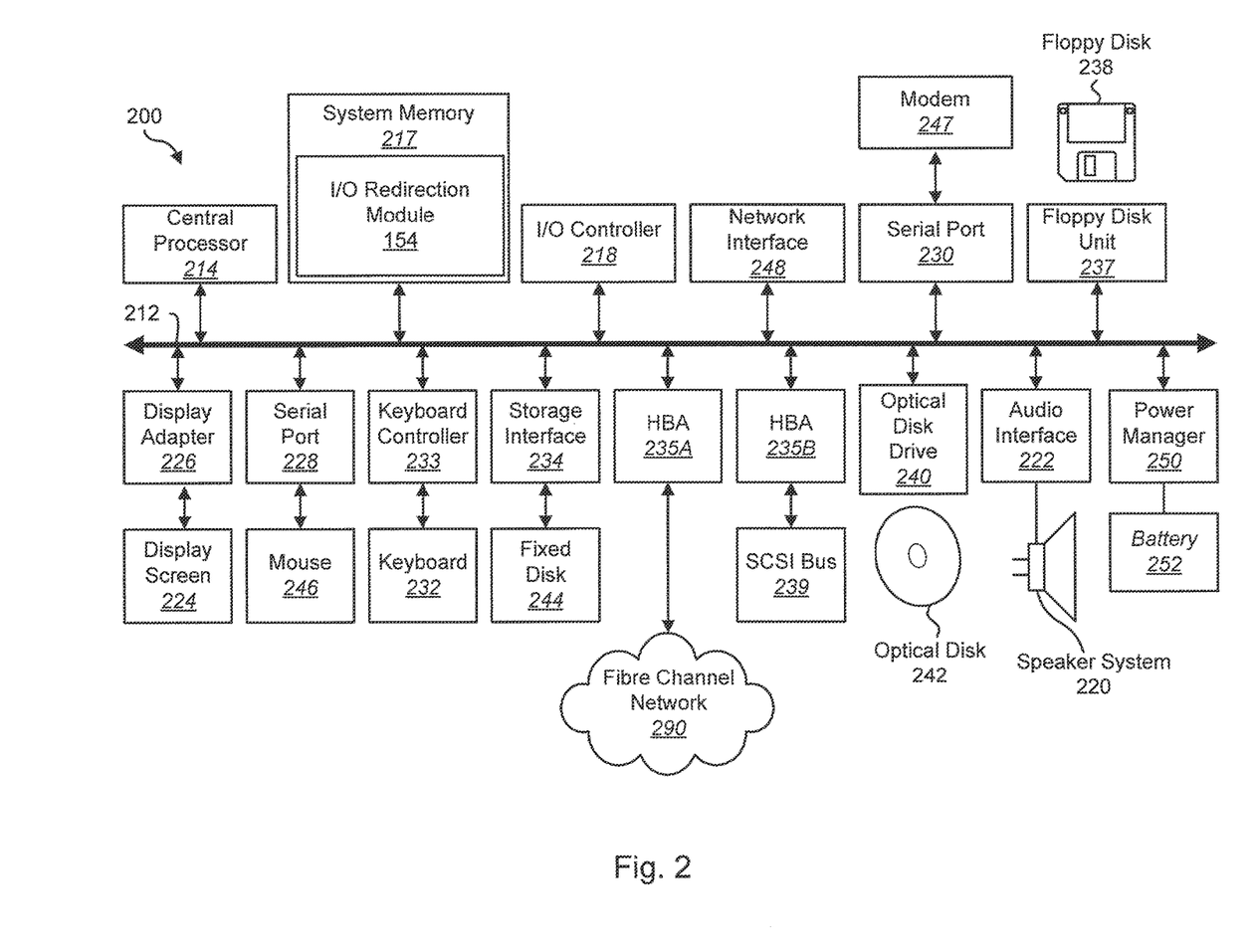
FIG. 2 depicts a block diagram of a computer system for I/O redirection in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N). Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface. Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for I/O redirection such as, for example, I/O redirection module 154. As illustrated, one or more portions of I/O redirection module 154 may reside at a network centric location. For example, server 140A may be a server, a firewall, a gateway, or other network element that may perform one or more actions to scan web applications for vulnerabilities. According to some embodiments, network 190 may be an external network (e.g., the Internet) and server 140A may be a gateway or firewall between one or more internal components and clients and the external network. According to some embodiments, I/O redirection module 154 may be implemented as part of a cloud computing environment.

FIG. 2 depicts a block diagram of a computer system 200 for I/O redirection in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, or other storage medium. For example, I/O redirection module 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 4:
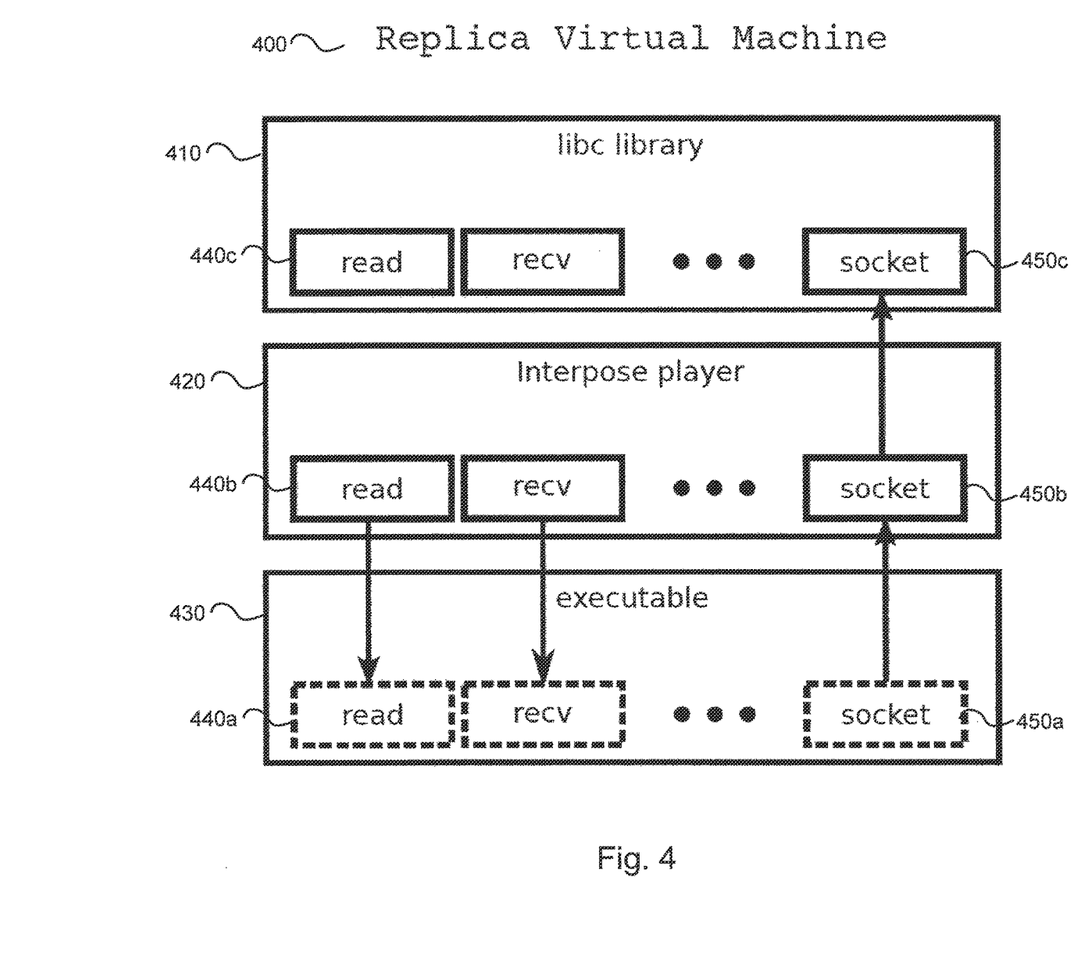
FIG. 4 depicts a replica virtual machine module accordance with an embodiment of the present disclosure.
Figure 5:
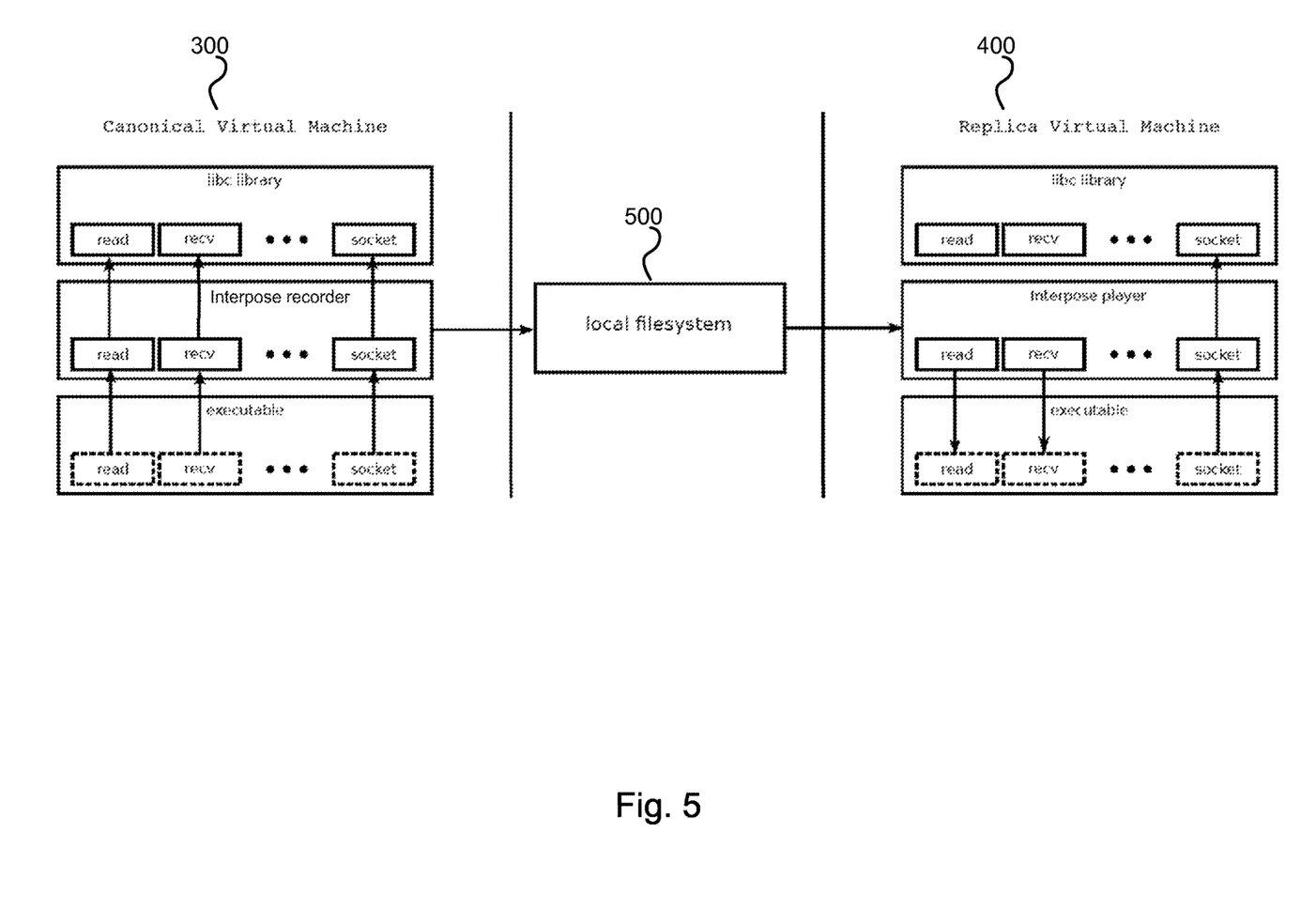
FIG. 5 depicts a local file system configuration for I/O redirection in accordance with an embodiment of the present disclosure.
Figure 6:
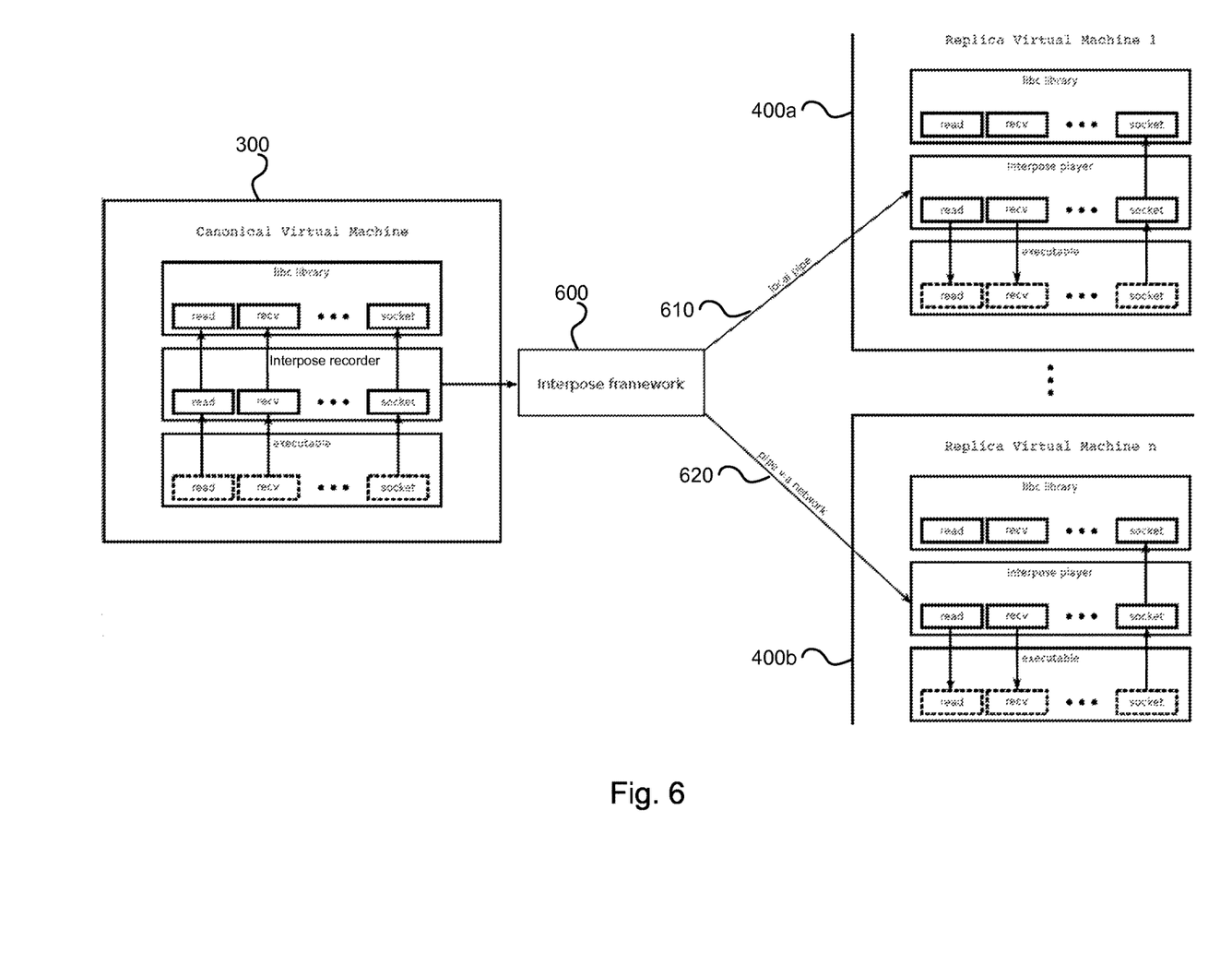
FIG. 6 shows a network-based configuration for I/O redirection in accordance with an embodiment of the present disclosure.

Referring to FIGS. 3-6, there is shown modules of an I/O redirection module 154 in accordance with an embodiment of the present disclosure. An I/O redirection module 154 may contain one or more components including an interpose recorder 320 (FIG. 3), an interpose player 420 (FIG. 4), a local file system interconnection 500 (FIG. 5), and an interpose framework 600 (FIG. 6).

The description below describes network elements, computers, and/or components of a system and method for I/O redirection that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Figure 3:
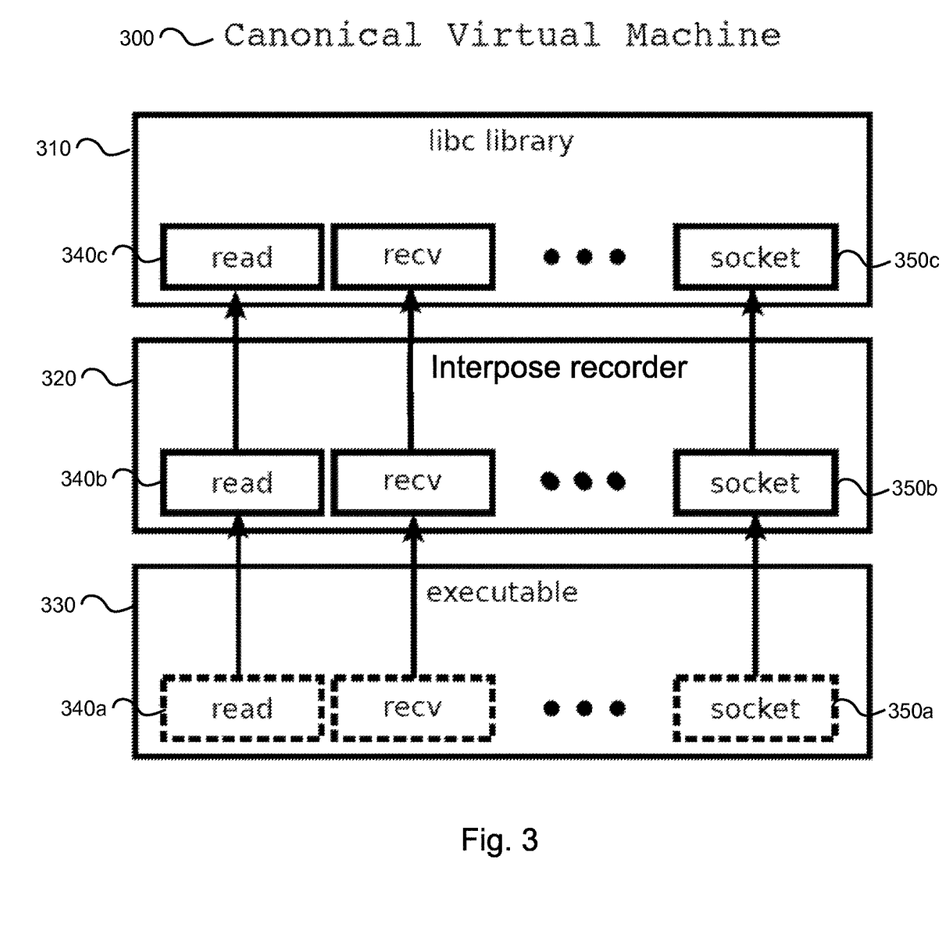
FIG. 3 shows a canonical virtual machine module in accordance with an embodiment of the present disclosure.

In FIG. 3, according to some embodiments, interpose recorder 320 may record I/O. The interpose recorder 320 may record I/O on a virtual machine such as canonical virtual machine 300. The canonical virtual machine 300 may be configured with a system library, such as libc library 310, and a computer program executable 330.

The libc library 310 may represent true functions that the executable 330 intends to call that the I/O redirection module 154 will record and replay. For example, in a Linux® environment, libc contains functions such as memory allocation, process management, and signal handling, as well as transmitting and receiving data over a network.

The canonical virtual machine 300 may be the baseline system from which I/O may be redirected to other systems. The interpose recorder 320 may be interposed between the library 310 and the executable 330. Through library interposition, the interpose recorder 320 may intercept I/O events as they are transmitted between the executable 330 and the library 310. For example, instead of I/O events passing directly from the executable 330 to the library 310, I/O events from the executable 330 may first pass through the interpose recorder 320. Recorded I/O events may include network connection metadata and data that has been transmitted or received. The library interposition may be transparent to the library 310 and the executable 330.

The interpose recorder 320 may be configured to intercept and record only certain high level I/O instead of every I/O event on its way to the library 310. For example, the interpose recorder 320 may be configured to intercept and record only network I/O events, such as read event 340a and socket event 350a. For example, a read input event may be received at executable 330, shown as read 340a. The executable may attempt to use the library 310 to process the read input event. The read input event may be intercepted by the interpose recorder 320, shown as read 340b. The interpose recorder 320 may record the read input event and associated data, after which the read event may proceed to the library 310, shown as read 340c.

In another example, a socket connection input event may be received at executable 330, shown as socket 350a. The executable may attempt to use the library 310 to process the socket input event. The socket input event may be intercepted by the interpose recorder 320, shown as socket 350b. The interpose recorder 320 may record the socket input event and associated data, after which the socket input event may proceed to the library 310, shown as read 350c. The interpose recorder 320 may record an arbitrarily long sequence of input events, such as high level network input events, for part or all of the time that the computer program executable 330 is running on the canonical virtual machine 300.

In FIG. 4, according to some embodiments, interpose player 420 may playback I/O for re-execution. The interpose player 420 may playback I/O on a virtual machine such as a replica virtual machine 400. In some embodiments, the replica virtual machine 400 has the same or similar operating system and computer architecture as the canonical virtual machine 300, whereas in other embodiments, the replica virtual machine 400 and the canonical virtual machine 300 have different operating systems or computer architectures. The I/O redirection module 154 may comprise a plurality of other replica virtual machines with the same or different configuration as the replica virtual machine 400.

The replica virtual machine 400 may be configured with a system library, such as libc library 410, and a computer program executable 430. The library 410 may be the same as the library 310 on the canonical virtual machine 300. Also, the computer program executable 430 may be the same as the computer program executable 330 on the canonical virtual machine 300. The replica virtual machine 400 may be a test system to which I/O may be redirected from another system such as canonical virtual machine 300. The interpose player 420 may be interposed between the library 410 and the executable 430. Through library interposition, the interpose player 420 may produce I/O events as if they were transmitted between the executable 430 and the library 410. Instead of I/O events passing directly from the library 410 to the executable 430, certain I/O events may originate from the interpose player 420, while other I/O events may pass through the interpose player 420.

The interpose player 420 causes the replica virtual machine to re-execute the I/O redirected from the canonical virtual machine 300. The interpose player 420 may be configured to playback only certain high level I/O instead of every I/O event. For example, the interpose recorder 320 may be configured to playback only network input events, such as read event 440a. For example, the interpose player may play back a read event, shown as read 440b. The read event may be received at executable 430, shown as read 440a. The read event may appears to the executable 430 as if it came from the library 410, shown as read 440c. The interpose player 420 may playback the read I/O event and associated data. The library interposition may be transparent to the library 410 and the executable 430.

In another example, a socket connection input event may be received at executable 430, shown as socket 450a. The executable may attempt to use the library 410 to process the socket input event. The socket input event may be intercepted by the interpose player 420, shown as socket 450b, after which the socket input event may proceed to the library 410, shown as read 450c.

The interpose player 420 may playback an arbitrarily long sequence of I/O events, such as high level network I/O events, for part or all of the time that the computer program executable 430 is running on the replica virtual machine 400. In some embodiments, the interpose player 420 may permit flexibility in handling I/O events such as network I/O events. For example, the interpose player 420 may allow for variance in read/buffer sizes during playback.

Referring to FIG. 5, according to some embodiments, there may be a local file system 500 to facilitate the interconnection between the canonical virtual machine 300 and the replica virtual machine 400. In this configuration, the interpose recorder 320 records I/O events in the canonical virtual machine 300 and stores the recorded events and associated data in the local file system 500. Subsequently, the interpose player 420 retrieves the recorded events and associated data from the local file system 500 and plays back the I/O events in the replica virtual machine 400.

In some embodiments, the local file system 500 enables the I/O redirection module 154 to store recorded I/O events offline for an indefinite period of time. The executable 330 on canonical virtual machine 300 may run to completion before the executable 430 on replica virtual machine 400 begins to run. The recorded I/O events stored on the local file system 500 may be used once and deleted, or they may be used repeatedly over a period of time. The local file system 500 may store an arbitrarily large number of recorded I/O events depending on the amount of storage space available in the local file system 500 and the length of time a recording is needed. In some embodiments, the local file system 500 enables the I/O redirection module 154 to function while it is offline. In other embodiments, the local file system 500 may be replaced by a remote file system connected to the network.

Referring to FIG. 6, according to some embodiments, there may be an interpose framework 600. The interpose framework 600 facilitates transferring recorded I/O events from the canonical virtual machine 300 to one or more replica virtual machines such as replicas 400a and 400b. In some embodiments, a replica virtual machine may be identical to the canonical virtual machine 300, while other replica virtual machines in the system may be variations of the configuration of the canonical virtual machine 300.

In FIG. 6, a first replica virtual machine 400a may reside on the same physical machine as that of canonical virtual machine 300. The first replica 400a is a local replica, connected to the interpose framework 600 by a local pipe 610, running in parallel with the canonical virtual machine 300 on the same physical computer host. A second replica virtual machine 400b may reside on a physical machine remote to that of canonical virtual machine 300. The second replica 400b is a remote replica, connected to the interpose framework 600 by a network pipe 620, running concurrently on a physical host connected through a distributed network.

In some embodiments, interpose framework 600 may transmit recorded I/O events and associated data in real time. The interpose framework 600 may receive a stream of I/O events and associated data from the canonical virtual machine 300 as soon as possible after they are recorded by the interpose recorder 320. As soon as possible after receiving a recorded I/O event and associated data, the interpose framework 600 may redirect the I/O to one or more replicas such as the local replica 400a and the remote replica 400b. The interpose framework 600 redirects I/O to local replicas through local pipe 610 and to remote replicas through network pipe 620.

The interpose framework 600 may broadcast redirected I/O to multiple replicas simultaneously. The interpose framework 600 does not need to wait for the executable 330 on canonical virtual machine 300 to run to completion. Instead, the interpose framework 600 enables testing the computer program executable running on a plurality of replica virtual machines simultaneously and at the same time that the baseline I/O recordings are being made at within the canonical virtual machine 300. Consequently, the interpose framework 600 facilities a highly efficient technique for redirection I/O for re-execution on a plurality of replica virtual machines for testing. In some embodiments, the local file system 500 (FIG. 5) may be used in conjunction with the interpose framework 600, whereby the recorded I/O may be redirected and replicated at other concurrently running replica virtual machines or saved for later replay. Additionally, in some embodiments, I/O redirection may involve transactional functions requiring more than one entry to perform a task. For these functions, the interpose framework 600 may synchronize the I/O so that the executables running on the replica virtual machines (e.g., 400a and 400b) will perform without errors such as synchronization errors.

Figure 7:
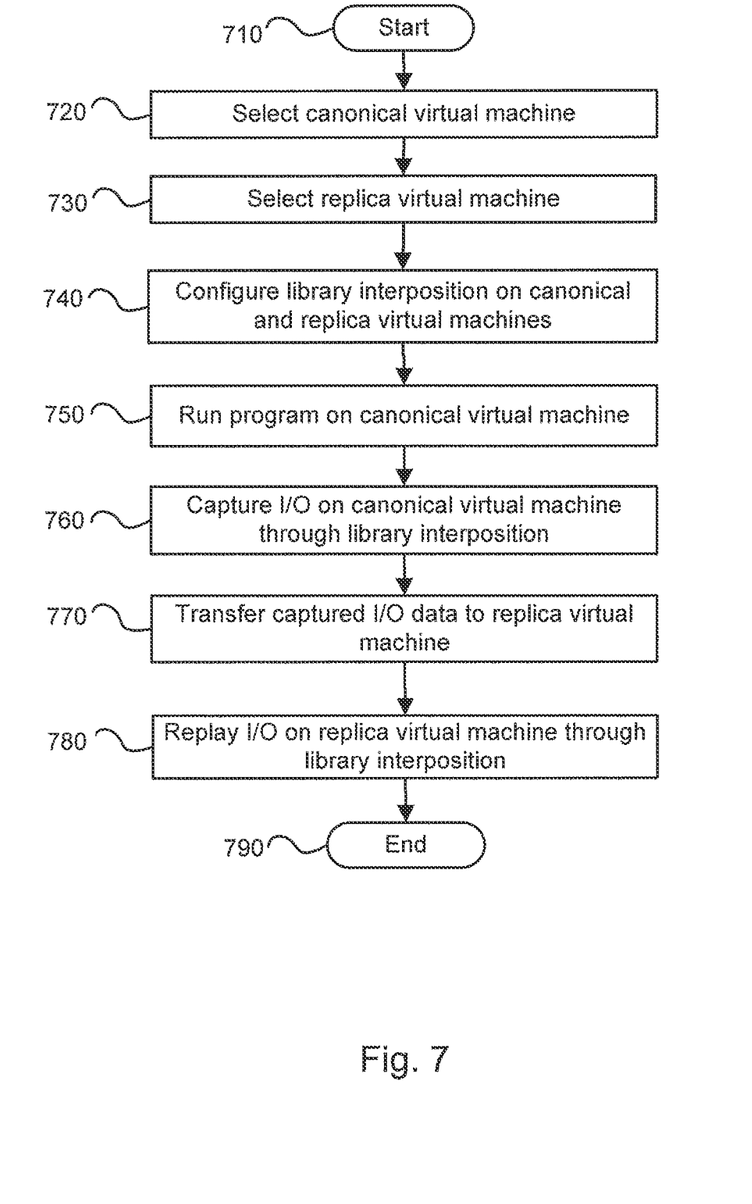
FIG. 7 shows a method for I/O redirection in accordance with an embodiment of the present disclosure.

Referring to FIG. 7, there is depicted a method 700 for redirecting I/O in accordance with an embodiment of the present disclosure. At block 710, the method 700 may begin.

At block 720, a canonical virtual machine may be selected. The canonical virtual machine may be configured with a system library and a computer program executable.

At block 730, a replica virtual machine may be selected. The replica virtual machine may be configured with a system library and the same computer program executable as that of the canonical virtual machine (block 720). The replica virtual machine may have a configuration or environment that differs from that of the canonical virtual machine.

At block 740, the canonical and replica virtual machines may be configured for library interposition. The canonical virtual machine may be configured with an interpose recorder for recording I/O events and associated data, and the replica virtual machine may be configured with an interpose player for playing back the recorded I/O events.

At block 750, the computer program executable may be run on the canonical virtual machine.

At block 760, as the executable is running, I/O events may be captured through library interposition via the interpose recorder.

At block 770, the captured I/O events and data may be transferred to the replica virtual machine. In some embodiments, the executable may run to completion (block 750), and the entire sequence of I/O events may be recorded. A local file system may store the sequence of I/O events to facilitate transferring them to a replica virtual machine at a later time. In other embodiments, individual I/O events may be transmitted to a replica virtual machine as they are being recorded or streamed from the canonical virtual machine with the running executable. The recorded I/O event may be sent through one or more local pipes or network pipes.

At block 780, the recorded I/O may be replayed on the replica virtual machine through library interposition via the interpose player. The replica virtual machine may receive a stream of I/O events as soon as possible after they occur while the canonical virtual machine is running (block 750). In other embodiments, the replica virtual machine may receive a stored sequence of recorded I/O for playback after the computer program on the canonical virtual machine (block 750) has run to completion.

At block 790, the method 700 may end.

At this point it should be noted that I/O redirection in accordance with the present disclosure as described above may involve the processing of input data and the generation of output data to some extent. This input data processing and output data generation may be implemented in hardware or software. For example, specific electronic components may be employed in a I/O redirection module or similar or related circuitry for implementing the functions associated with I/O redirection in accordance with the present disclosure as described above. Alternatively, one or more processors operating in accordance with instructions may implement the functions associated with I/O redirection in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer-implemented method for redirecting input/output comprising:
   configuring a first virtual machine with a recorder for library interposition;
   configuring a replica virtual machine with a player for library interposition;
   receiving a first recorded event from the first virtual machine; and
   transferring, via an input/output redirection module, the first recorded event to the replica virtual machine for replay,
   wherein the replica virtual machine further comprises an interpose player configured to send read requests to an executable program and receive socket input requests from the executable program, and
   wherein the replica virtual machine further comprises a replica system library, the replica system library comprising libc as a standard C library and configured to receive and process the socket input requests from the interpose player.

2. The computer-implemented method of claim 1, further comprising receiving a subsequent recorded event from the first virtual machine after the first recorded event was transferred for replay.

3. The computer-implemented method of claim 1, further comprising:
   configuring a plurality of replica virtual machines, wherein each replica virtual machine of the plurality of replica virtual machines is configured with a player of a plurality of players for library interposition; and
   transferring the first recorded event to at least two replica virtual machines of the plurality of replica virtual machines for replay,
   wherein the first recorded event is transferred to the at least two replica virtual machines of the plurality of replica virtual machines concurrently for replay.

4. The computer-implemented method of claim 1, wherein the first virtual machine comprises a first architecture, and wherein the replica virtual machine comprises a second architecture different from the first architecture.

5. The computer-implemented method of claim 1, wherein the first recorded event is a network-based input/output event.

6. The computer-implemented method of claim 1, wherein the first recorded event is transferred through a local pipe.

7. The computer-implemented method of claim 1, wherein the first recorded event is transferred through a network pipe.

8. The computer-implemented method of claim 1, wherein the first recorded event comprises a data transmission associated with the event.

9. A system for redirecting input/output comprising:
   one or more hardware processors communicatively coupled to a network; wherein the one or more hardware processors are configured to:
   configure a first virtual machine with a recorder for library interposition;
   configure a replica virtual machine with a player for library interposition;
   receive a first recorded event from the first virtual machine; and
   transfer the first recorded event to the replica virtual machine for replay,
   wherein the replica virtual machine further comprises an interpose player configured to send read requests to an executable program and receive socket input requests from the executable program, and
   wherein the replica virtual machine further comprises a replica system library, the replica system library comprising libc as a standard C library and configured to receive and process the socket input requests from the interpose player.

10. The system of claim 9, wherein the one or more hardware processors are further configured to receive a subsequent recorded event from the first virtual machine after the first recorded event was transferred for replay.

11. The system of claim 9, wherein the one or more hardware processors are further configured to:
   configure a plurality of replica virtual machines, wherein each replica virtual machine of the plurality of replica virtual machines is configured with a player of a plurality of players for library interposition; and transfer the first recorded event to at least two replica virtual machines of the plurality of replica virtual machines for replay, wherein the first recorded event is transferred to the at least two replica virtual machines of the plurality of replica virtual machines concurrently for replay.

12. The system of claim 9, wherein the first recorded event is a network-based input/output event.

13. The system of claim 9, wherein the first recorded event is transferred through a network pipe.

14. The system of claim 9, wherein the first recorded event comprises a data transmission associated with the event.

15. An article of manufacture for redirecting input/output, the article of manufacture comprising:

at least one non-transitory processor readable storage medium; and instructions stored on the at least one medium;

wherein the instructions are configured to be readable from the at least one medium by at least one processor and thereby cause the at least one processor to operate so as to:

configure a first virtual machine with a recorder for library interposition;

configure a replica virtual machine with a player for library interposition;

receive a first recorded event from the first virtual machine; and transfer the first recorded event to the replica virtual machine for replay, wherein the replica virtual machine further comprises an interpose player configured to send read requests to an executable program and receive socket input requests from the executable program, and wherein the replica virtual machine further comprises a replica system library, the replica system library comprising libc as a standard C library and configured to receive and process the socket input requests from the interpose player.

16. The article of manufacture of claim 15, wherein the instructions cause the at least one processor to operate further so as to receive a subsequent recorded event from the first virtual machine after the first recorded event was transferred for replay.

17. The article of manufacture of claim 15, wherein the instructions cause the at least one processor to operate further so as to:

configure a plurality of replica virtual machines, wherein each replica virtual machine of the plurality of replica virtual machines is configured with one player of a plurality of players for library interposition; and transfer the first recorded event to the plurality of replica virtual machines for replay, wherein the first recorded event is transferred to each replica virtual machine of the plurality of replica virtual machines concurrently for replay.

18. The article of manufacture of claim 15, wherein the first recorded event is a network-based input/output event.

19. The article of manufacture of claim 15, wherein the first recorded event is transferred through a network pipe.

20. The article of manufacture of claim 15, wherein the first recorded event comprises a data transmission associated with the event.

* * * * *